Dec. 14, 1926.
J. R. GAMMETER
1,610,942
ENDLESS BELT AND METHOD OF MAKING THE SAME
Filed April 9, 1921
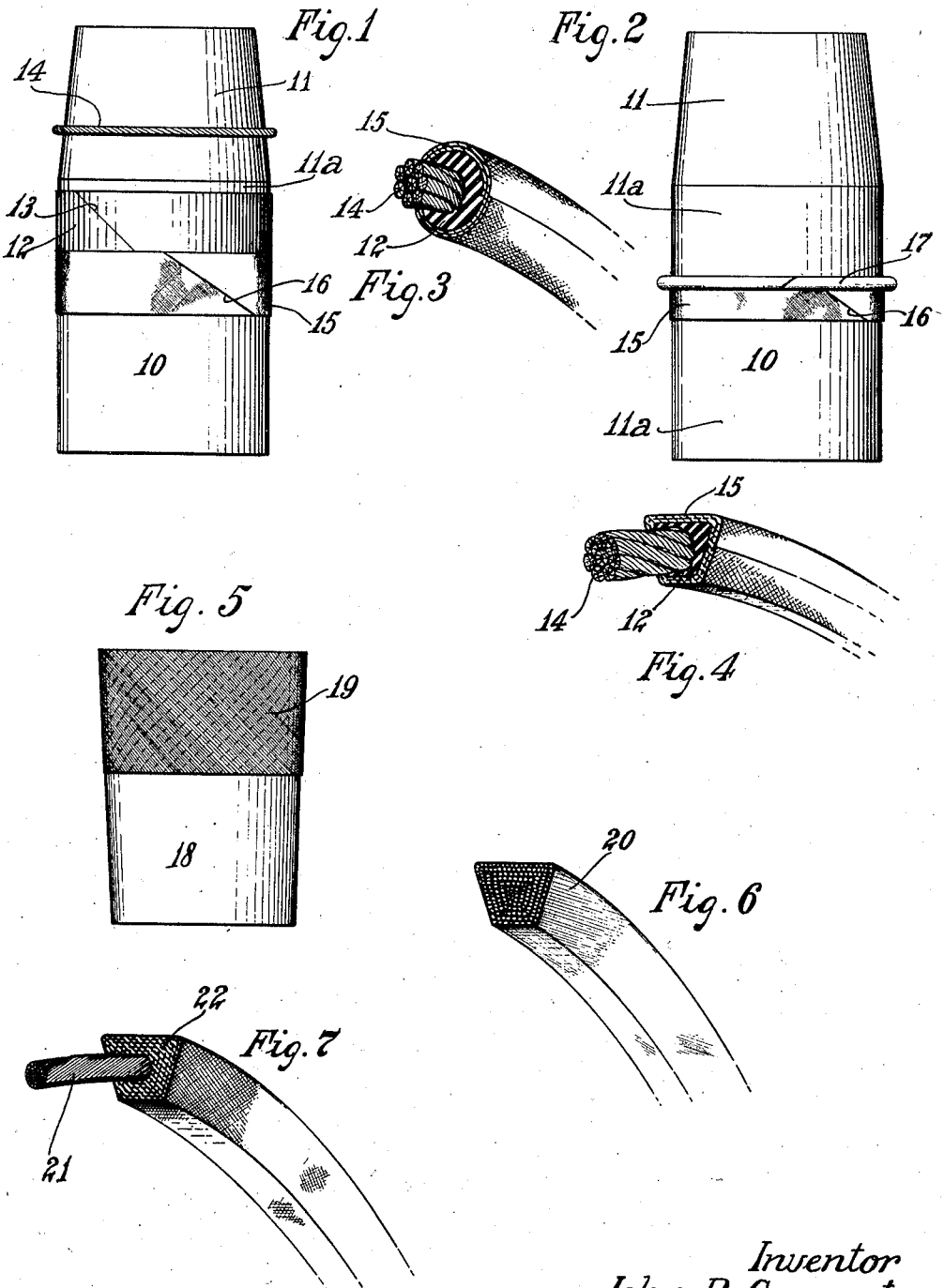
Inventor
John R. Gammeter
By Robert M. Pierson
Atty.

Patented Dec. 14, 1926.

1,610,942

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

ENDLESS BELT AND METHOD OF MAKING THE SAME.

Application filed April 9, 1921. Serial No. 460,048.

This invention relates to endless belts composed of fibrous material and a moldable or vulcanizable material such as rubber, and to methods of manufacturing the same.

Its object is to provide a strong and durable belt which will have substantially uniform cross-sectional size, shape and structure, and will be accurately limited as to circumferential stretchability, and to provide an improved method of constructing belts of the materials above mentioned, whereby the operation may be rapid and accurate without requiring great skill upon the part of the workman.

Of the accompanying drawings:

Fig. 1 is a side elevation of a mandrel adapted for the practice of my invention, with a belt-core, a band of rubber filler, and a cover strip thereon.

Fig. 2 is a similar view showing a later step.

Fig. 3 is a perspective view of a part of a belt representing one stage of the process.

Fig. 4 is a similar view of the finished belt after vulcanization in a mold.

Fig. 5 is a side elevation of a mandrel with a band of weak-wefted thread fabric thereon, representing a modification of my method.

Fig. 6 is a perspective view of a part of a belt made entirely of rubberized fabric.

Fig. 7 is a similar view showing a belt with a core of thread or cord fabric.

Referring to Figs. 1 and 2, 10 is a mandrel with a frusto-conical upper end portion 11 and a cylindrical lower portion 11ª. 12, Fig. 1, is a band of sheet rubber encircling the cylindrical portion of said mandrel and joined by a diagonal seam as shown at 13. 14 is an annular cord core, which may be of any ordinary construction but preferably is of cabled cord, as shown. The conical portion 11 of the mandrel is adapted to stretch the core as the latter is rolled down over it onto the cylindrical portion 11ª of the mandrel. 15, Figs. 1 and 2, is a band of rubberized fabric, such as ordinary square-woven duck, preferably bias-cut, as shown, encircling the cylindrical portion of the mandrel and joined by a diagonal or oblique seam 16, said band in Fig. 2 being partly rolled upon itself, as shown at 17. Referring to Figs. 3 and 4, 14 is the cabled cord core as it appears in the belt structure, 12 is an intermediate layer of rubber, and 15 is a fabric cover.

In Fig. 5, 18 is a modified form of frusto-conical mandrel, inverted or tapered downwardly to permit the fabric to be rolled downward upon itself without substantial stretching of the inner plies of fabric. 19 is a band of bias-cut, weak-wefted thread fabric mounted thereon. 20, Fig. 6, is a part of a belt made entirely of rubberized fabric, as it appears after being vulcanized in a mold (not shown). In Fig. 7, 21 is a belt core made of weak-wefted thread fabric or of weftless thread or cord fabric and 22 is the main body of the belt, said body also being made of any suitable fabric, such as square-woven, bias-cut fabric.

In practicing my invention, to produce the belt shown in Fig. 4, I take a strip of vulcanizable, raw sheet rubber of approximately the length of the belt to be made and cut the ends diagonally in the same direction, giving the strip the form of a parallelogram. This strip is then rendered sticky on one side by the application of benzine or the like, placed upon the cylindrical part of the mandrel, Fig. 1, with the sticky side out, and the ends are joined in a seam 13, which may be either a lap or a butt seam, the sticky surface of the band causing the ends to adhere to each other. The endless core 14, of appropriate length, which, as above stated, may be of any usual construction, is then rolled down over the conical part of the mandrel, being somewhat stretched in this operation due to the conical form of the mandrel, and onto the band of sticky rubber. The rubber band adheres to the core and as the latter is rolled on downward the rubber band is rolled with it, forming a ring of rubber of approximately circular cross-section, with the annular core 14 inside of it. As the sticky outer surface of the rubber, in this rolling process, adheres to its inner surface as the two come in contact, the rubber strip retains the form of a coating for the cord core even if the ring be removed from the mandrel.

Because of the layers of rubber that are built up between the core and the mandrel, the core is further stretched during this operation.

I then, or at the same time with the strip of rubber, place upon the mandrel a strip of rubberized fabric, preferably cut on a bias, in the same manner as that above described as to the band of rubber, with its rubber-coated side out, joining its ends in a diagonal lap or butt seam as shown at 16, Figs. 1 and 2.

The ring formed as above described, comprising an annular core with a coating of plastic rubber rolled upon it, is then rolled down onto the band of fabric, which, due to its sticky outer surface, adheres to the ring and is rolled with it, forming a covering of one or more plies of fabric according to the width of the band of fabric as placed upon the mandrel. The result is an annular structure of approximately circular cross-section, as shown in Fig. 3, comprising the inner core of cord, 14, the intermediate layer of rubber 12 and the outer cover of rubberized fabric 15.

This structure is then placed in an annular mold having the cross-sectional form desired in the finished belt and vulcanized under lateral compression, being thereby caused to assume the cross-sectional form desired, the V-type of belt being used for illustration in Figs. 4, 6 and 7. The mold may, if desired be constructed in any well-known or suitable manner so as to expand and stretch the belt as it is forced onto the latter.

It will be observed that when the rolling of the material is performed upon a cylindrical part of a mandrel, as above described and as shown in Figs. 1 and 2, there is a progressive stretching of the core as successive plies of rubber and fabric come between the core and the mandrel. This, together with the initial stretching of the core by rolling it upon the frusto-conical portion of the mandrel, results in stretching the core by a predetermined amount, and the core is thereafter held substantially in that stretched condition by the filler and cover applied to it, so that a comparatively small amount of stretching or none at all is required in the vulcanizing mold, depending upon whether a substantially inextensible or a slightly resilient belt is desired, and after vulcanization the rubber in the filler and cover permanently secure the belt in its final condition.

In the modification of my invention shown in Fig. 6, the belt is made entirely of a single piece of rubberized fabric. This band of fabric is rolled upon itself, either with or without stretching, according to the shape of the mandrel, forming an annular structure of rubberized fabric. I may roll one piece of fabric to produce a core such as 21, Fig. 7, and thereafter, by the process above described, place upon it a body of fabric 22 either with or without an intermediate layer of rubber.

While the fabric in the ring or grommet forming the core 21 may be of any suitable character, I prefer to make it, as shown, of so-called thread or cord fabric in which the warp threads are held together by rubber and in some instances also by occasional weak weft threads, the threads or cords in any case being on the bias. Hence the strength-giving cords will lie in parallel, helical positions and will the more readily adjust themselves to each other and, when the core is stretched or pulled longitudinally as by rolling it over a conical surface or rolling it in a cover over a cylindrical or conical surface as described, will exert a constricting force upon each other to anchor the ends thereof at the splice. This form of core may be economically made, a spliced annulus being produced by the method described without the tedious operation of weaving the ends of individual threads through the structure, as in the case of splicing a cable, and yet the thread-ends lie at different points circumferentially of the core and the end portions of the successive convolutions of fabric are suitably gripped between the adjacent convolutions when the structure is put under tension.

In Fig. 5 the rolling is not started with a core requiring to be stretched onto the fabric, but simply begins with the upper edge of the fabric itself. The mandrel 18 is shown as tapered downward, this form being suitable where it is not desired to stretch the inner plies or core during the rolling process. The section being progressively smaller downward, compensates for the increasing thickness of the roll as it moves downward upon the mandrel. When a core is used the mandrel preferably is formed with a conical top, as in Figs. 1 and 2, to facilitate bringing the core into position for rolling with the cover and, if desired, to stretch it before applying the latter thereto.

Bands of different material, such as the rubber, 12, and the fabric 15, may be placed side by side upon the same mandrel before the rolling is begun as shown in Fig. 1, and each of them picked up in succession by a single rolling operation.

The cord core 14 gives the belt great strength, and the fabric cover 15 resists surface wear and preserves the form of the belt, while the intermediate filler 12 cushions the core and gives the belt a cross sectional resiliency which improves its gripping quality. The fabric cover being composed of a single piece of fabric wound in a plurality of plies strengthens the belt, retains its form and holds the core in its stretched condition. As the cover band is formed with an oblique seam, the seam is not superposed upon itself in successive plies but passes helically along the belt, as shown clearly in Fig. 2, thus avoiding the concentration of any weakness or thickening effect incident to the seam. The cover being bias-cut gives it greater elasticity in the directions in which it is required to be stretched, whereby it conforms readily to the desired shape.

Further modifications may be resorted to without departing from my invention, and I do not limit my claims wholly to the specific structures and procedures shown and described.

I claim:

1. An endless, vulcanized, side-driving, transmission belt of solid construction comprising a substantially inextensible cord or thread core, and covering material thereon including a bias, rubberized, woven, fabric band transversely wrapped about said core in a plurality of convolutions, the core being held in stretched condition by said covering material.

2. A belt according to claim 1 in which the fabric band is diagonal-seamed.

3. An endless, vulcanized, side-driving transmission belt of solid construction having a cover portion consisting of a diagonal-spliced, transversely-rolled band of bias fabric thinly rubberized at the driving surface.

4. A vulcanized, endless, side-driving belt comprising an annular core of fibrous material, an intermediate layer of soft rubber enclosing said annular core, and a cover composed of a band of rubberized fabric enclosing said intermediate layer in a plurality of convolute plies.

5. A belt comprising an annular core formed of a bias-cut band of substantially weftless rubberized fabric rolled laterally in a plurality of convolutions.

6. A belt comprising an annular core formed of a sheet of fibrous material rolled laterally upon itself and held in a stretched condition by vulcanized rubber.

7. A process of belt making which comprises wrapping in annular form, upon a mandrel, flexible material including fabric thinly coated with vulcanizable rubber, rolling said material upon itself along the mandrel to form a solid, endless body with the thinly-rubberized fabric on the outside, and to consolidate the belt, and vulcanizing the belt.

8. The process of making an endless, side-driving belt which comprises wrapping upon a form a band of rubberized fabric to constitute the outermost portion of the belt, placing thereon other flexible material to form the central portion of the belt, rolling said band along the form, around said central material, in such manner as to stretch the central portion and consolidate all portions of the belt, and vulcanizing the belt in stretched condition.

9. The method of making a belt which comprises placing a band of rubberized, bias cover fabric upon a substantially conical mandrel, placing reinforcing cord or thread core material thereon, rolling said cover band upon itself and upon the core material toward the smaller end of said mandrel, and vulcanizing the belt.

10. The method of making a belt which comprises making a fibrous cord grommet and stretching the same by rolling it on a substantially conical surface from the smaller to the larger part of said surface.

11. The method of making a belt which comprises making a grommet of rubberized cord, stretching the same by rolling it on a substantially conical surface from the smaller to the larger part of said surface, and vulcanizing said grommet.

12. The method of making a belt which comprises making a grommet of rubberized cord, stretching the same by rolling it on a substantially conical surface from the smaller to the larger part of said surface, and molding and vulcanizing said grommet.

13. The method of making a belt which comprises making a fibrous cord grommet, stretching the same by rolling it on a substantially conical surface from the smaller to the larger part of said surface, applying a cover including rubber to said grommet, and vulcanizing the resulting product.

14. The method of making a belt which comprises making a fibrous cord grommet, stretching the same by rolling it on a substantially conical surface from the smaller to the larger part of said surface, applying a cover including rubber to said grommet, and molding and vulcanizing the resulting product.

15. The method of making a belt which comprises making a fibrous cord grommet, stretching the same by rolling it on a substantially conical surface from the smaller to the larger part of said surface, and applying a plastic envelope to said grommet.

16. The method of making a belt which comprises making a fibrous cord grommet, stretching the same by rolling it on a substantially conical surface from the smaller to the larger part of said surface, and applying a plastic envelope and a fabric cover to said grommet.

17. The method of making a belt which comprises making a fibrous cord grommet, stretching the same by rolling it on a substantially conical surface from the smaller to the larger part of said surface, applying a plastic envelope and a fabric cover to said grommet, and molding and vulcanizing the resulting product.

18. The method of making a belt which comprises placing an annular strip of material upon a substantially conical mandrel, rolling said strip upon itself toward the smaller end of said mandrel to form a ring composed of successive layers of material, and then vulcanizing said ring.

19. The method of making a belt which comprises rolling an annular core of fibrous material upon and with successively a band of rubber and a band of rubberized fabric, and vulcanizing the resulting structure.

20. The method of making a belt which comprises rolling a strip of fibrous material upon itself to form an annular core, applying rubber to said core, and vulcanizing the resulting structure.

21. The method of making a belt which comprises rolling a strip of fibrous material upon itself to form an annular core, stretching said core, and applying a plastic to said core to hold it in its stretched condition.

22. The method of making a belt which comprises rolling an annular core upon a substantially conical part of a support to stretch said core, rolling said core, while so stretched, upon and with a band of material mounted upon said support, to cover said core with a plurality of layers of said material, and molding the resulting structure.

23. The method of making a belt which comprises rolling an annular core upon a substantially conical portion of a support to stretch said core, rolling said core further on a cylindrical portion of said support picking up, successively, a band of rubber and a band of rubberized fabric, and vulcanizing the resulting structure.

24. A process of belt making which consists in forming a tube of flexible material, placing reinforcing cords thereon, and then rolling one edge of the material from one end of the tube toward the other end thereof.

25. A process of belt making which consists in forming a tube of rubberized fabric having its warp and woof threads running diagonally upon the surface of the tube, placing reinforcing means circumferentially on the surface of the tube, then rolling one edge of the fabric from one end of the tube towards the other end thereof.

26. A process of belt making which comprises progressively wrapping vulcanizable material, including a band of rubberized fabric, transversely about an endless, reinforcing core while maintaining said core under tension, consolidating said material upon the core and upon itself during and by the process of wrapping, and vulcanizing the belt.

In witness whereof I have hereunto set my hand this 31st day of March, 1921.

JOHN R. GAMMETER.